Patented Feb. 28, 1950

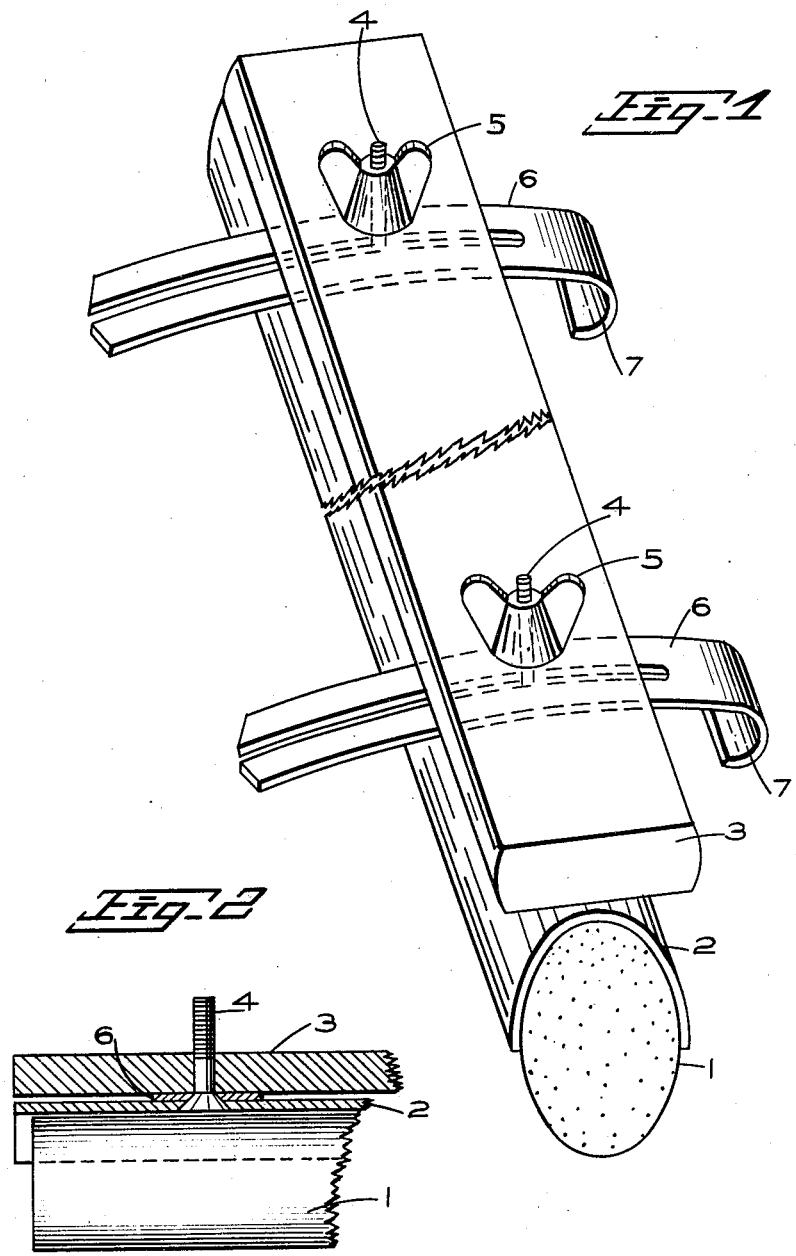

2,498,938

UNITED STATES PATENT OFFICE 2,498,938

LAWN MOWER SHARPENER

Lewin Bentley, Chilliwack, British Columbia, Canada

Application November 26, 1947, Serial No. 788,121
In Canada April 26, 1947

1 Claim. (Cl. 51—250)

My invention relates to tool sharpeners, more particularly having reference to a device for sharpening lawn mowers.

In the art to which the invention relates, various devices have been proposed for sharpening lawn mowers by attachment of the device to the mower and spinning the blade wheel, the device providing a grinding member held in sharpening relation to the blade.

The present invention contemplates improvements in devices of this character by providing a simple and economically manufactured device that is very effective as a blade sharpener for lawn mowers.

One of the objects of the invention is accordingly to provide an improved attachment for sharpening lawn mowers that may easily be applied to any standard type of mower, is economical to manufacture, and is a convenient size.

A further object of the invention is to provide in a lawn mower sharpening device, improved means of attachment of the device to the mower and adjustable to fit any regular type of mower.

A still further object of the invention is to provide such a device employing an ordinary whetstone, or any ordinary abrasive stone as in common use, and permitting replacement of the stone, also turning the stone as it becomes worn.

Other features and advantages of the invention will become apparent by reference to the accompanying description taken in conjunction with the drawings wherein like characters of reference indicate like parts throughout the several views and wherein:

Fig. 1 is a perspective view of a holder embodying my improvements and shown with the sharpening stone engaged thereby.

Fig. 2 is a detail fragmentary view showing attachment of the clamping plate, bar and brackets, the plate and bar being in section.

Having reference to the drawings there is provided a holder for a blade sharpening stone 1, the stone being of an elongated type that is oval in cross section and in common use.

For attachment of the stone to the holder I provide a metal resilient plate 2 that is curved to the contour of the stone to intimately fit thereon and is adapted to be sprung into resilient clamping engagement with the stone, and for which the plate preferably extends downward past the medial line of the stone.

On the plate 2 is carried a bar 3, preferably of wood, for engagement of which two screw bolts 4—4 are provided with winged nuts 5, said bolts being adapted for engagement of slotted clamps 6—6, said clamps being endwise adjustable on the bolts to accommodate different types and sizes of mowers. The ends of the clamps are curved, as at 7, to engage the axle of the mower by which the sharpening attachment may be carried on the mower resting against the blades, gravitating thereon to contact the cutting edge of each blade member when the blades are rotated. The bolts 4 serve to hold the assembly of plate, bar and clamps together.

In the use of the device the clamps 6—6 are engaged on the mower axle with the sharpener adjusted thereon to bring the stone 1 in sharpening relation to the blades.

The mower blades are then rotated in the sharpening operation. The sharpener may be moved along the axle to be used throughout the length of the blade. When the stone becomes worn it may be reversed and other sides employed until too worn to be held by the holder. The plate 2 may be shaped to accommodate and grip any preferred shape of stone.

While I have herein disclosed a preferred embodiment of my invention it is obvious that changes in the construction of parts would be conceivable and in so far as such changes come within the spirit and scope of the invention as described in the appended claims they would be considered a part hereof.

What I claim and wish to secure by Letters Patent is:

A sharpening attachment for lawn mowers comprising an elongated sharpening stone, a plate adapted for clamping engagement of the stone, a flat bar on the plate lengthwise thereof, bolts through the plate and bar, and brackets providing slots by which said brackets may be mounted slidable on the bolts between the plate and bar, and said brackets providing curved ends adapted for engagement of the axle of a mower to be sharpened.

LEWIN BENTLEY.

REFERENCES CITED

The following references are of record in the file of this patent:

UNITED STATES PATENTS

| Number | Name | Date |
|---|---|---|
| 1,211,338 | Oman | Jan. 2, 1917 |
| 1,426,548 | Connolly | Aug. 22, 1922 |
| 1,843,830 | Michalski | Feb. 2, 1932 |